(12) United States Patent
Kunieda

(10) Patent No.: US 9,129,405 B2
(45) Date of Patent: Sep. 8, 2015

(54) IMAGE PROCESSING APPARATUS AND METHOD

(71) Applicant: CANON KABUSHIKI KAISHA, Tokyo (JP)

(72) Inventor: Shutaro Kunieda, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/751,744

(22) Filed: Jan. 28, 2013

(65) Prior Publication Data

US 2013/0195379 A1    Aug. 1, 2013

(30) Foreign Application Priority Data

Feb. 1, 2012  (JP) ................................. 2012-020305
Jan. 18, 2013  (JP) ................................. 2013-007847

(51) Int. Cl.
*G06K 9/32* (2006.01)
*G06T 3/40* (2006.01)

(52) U.S. Cl.
CPC ................. *G06T 3/40* (2013.01); *G06T 3/4038* (2013.01)

(58) Field of Classification Search
USPC .................. 382/298, 293, 232, 238, 239, 240
See application file for complete search history.

(56) References Cited

U.S. PATENT DOCUMENTS 5,875,039 A * 2/1999 Ohsawa et al. ............... 382/248
6,141,459 A * 10/2000 Gendel .......................... 382/256

* cited by examiner

*Primary Examiner* — Yon Couso
(74) *Attorney, Agent, or Firm* — Cowan, Liebowitz & Latman, P.C.

(57) ABSTRACT

An image processing apparatus generates an image appended with additional effective pixels by executing appending processing for appending additional effective pixels by extending input image data in a scanning direction using pixels at terminal ends of the input image data in the scanning direction. The image processing apparatus generates image data of a second hierarchy obtained by reducing the input image data by applying filtering to the generated image appended with the additional effective pixels, and generates image data of a third hierarchy by applying filtering to the image data of the second hierarchy.

22 Claims, 6 Drawing Sheets

F I G. 3
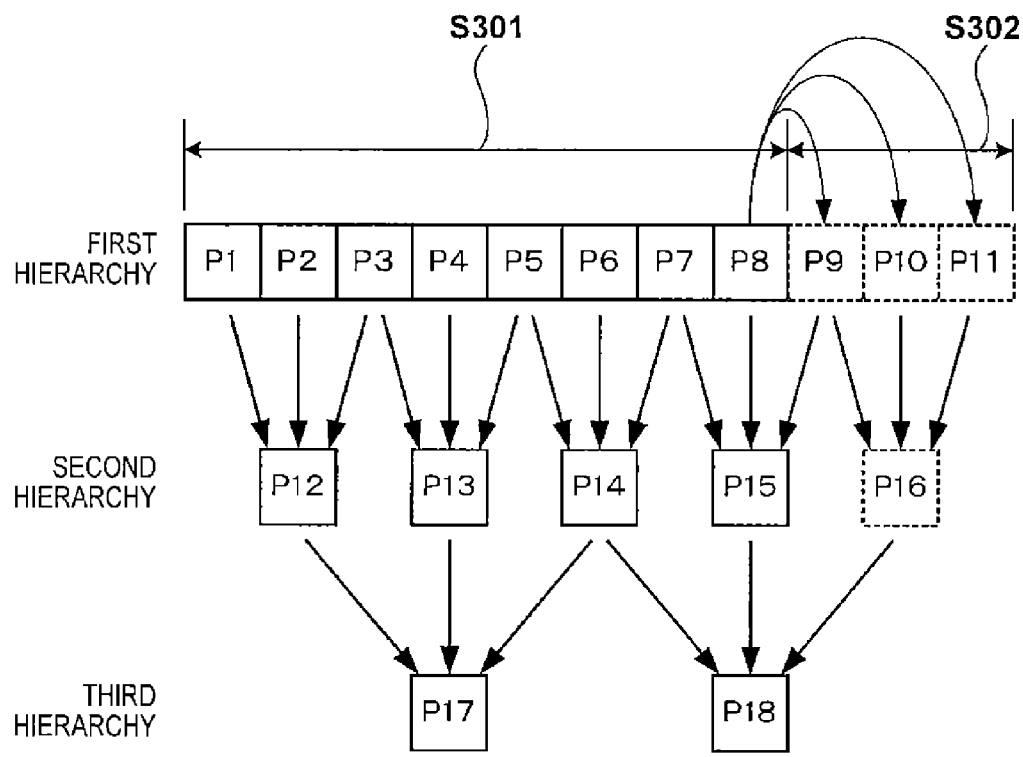

IMAGE PROCESSING APPARATUS AND METHOD

BACKGROUND OF THE INVENTION

1. Field of the Invention

The present invention relates to an image processing apparatus and method used in resizing of image data.

2. Description of the Related Art

Most of image sensors include a large number of effective pixels and a large number of ineffective pixels, which are arranged to surround the large number of effective pixels. A signal value of an effective pixel is used as image data, and that of an ineffective pixel is used to acquire correction data required to correct image data obtained from the effective pixel.

In order to resize image data obtained from such an image sensor, it is a common practice to use FIR digital filtering. Upon application of the FIR digital filtering, image processing is executed by making a convolution using a signal value of a pixel of interest, and signal values of a predetermined number of pixels around the pixel of interest. When the pixel of interest is located at an end portion of effective pixel, a filtering reference range includes ineffective pixels. For this reason, upon application of filtering for reduction processing, an additional effective pixel as a copy of an effective pixel located at the end portion is added to the outside of that effective pixel, and filtering is then applied.

Japanese Patent Laid-Open No. 11-154227 (to be referred to as literature 1 hereinafter) described an arrangement which outputs an image pyramid by generating a plurality of reduced images. In literature 1, a plurality of hierarchies of reduced images are generated by repeating a reduction process for executing additional effective pixel generation processing for adding an additional effective pixel to a border between an ineffective pixel and an effective pixel, and for applying filtering and down-sampling to an image having additional effective pixels. Such processing requires processing for judging a border between an effective pixel and an ineffective pixel in image data of each hierarchy, and adding an additional effective pixel to the border.

In general, in image processing for resizing image data, whether or not a filter reference range includes a border between an effective pixel and an ineffective pixel is judged, and if the border is included, an additional effective pixel is required to be added to outside of an effective pixel at an end portion. When the additional effective pixel generation processing is executed using image data during a video effective period in the reduction process of each hierarchy, a performance drop occurs in, for example, on-the-fly processing of movie shooting executed without the intervention of a DRAM.

SUMMARY OF THE INVENTION

The present invention has been made in consideration of the aforementioned problems. One embodiment of the present invention provides an image processing apparatus and method, which can acquire resized images over a plurality of hierarchies, while suppressing a performance drop of image data recording by a simple arrangement.

According to one aspect of the present invention, there is provided an image processing apparatus comprising: an additional effective pixel appending unit configured to generate an image appended with additional effective pixels by executing appending processing for appending additional effective pixels required to extend image data of a first hierarchy in a scanning direction using pixels at an end portion of the image data in the scanning direction; a first generating unit configured to generate image data of a second hierarchy obtained by reducing the image data of the first hierarchy by applying filtering to the image appended with the additional effective pixels generated by the additional effective pixel appending unit; and a second generating unit configured to generate image data of a third hierarchy obtained by reducing the image data of the second hierarchy by applying filtering to the image data of the second hierarchy.

According to another aspect of the present invention, there is provided an image processing method by an image processing apparatus for generating multi-hierarchy reduced images from an input image, comprising: a additional effective pixel appending step of generating an image appended with additional effective pixels by executing appending processing for appending additional effective pixels required to extend image data of a first hierarchy in a scanning direction using pixels at an end portion of the image data in the scanning direction; a first generating step of generating image data of a second hierarchy obtained by reducing the image data of the first hierarchy by applying filtering to the image appended with the additional effective pixels generated in the additional effective pixel appending step; and a second generating step of generating image data of a third hierarchy obtained by reducing the image data of the second hierarchy by applying filtering to the image data of the second hierarchy.

Further features of the present invention will become apparent from the following description of exemplary embodiments with reference to the attached drawings.

BRIEF DESCRIPTION OF THE DRAWINGS

FIG. 3 is a view for explaining the reduction process and appending of additional effective pixels according to the embodiment;

DESCRIPTION OF THE EMBODIMENTS

Preferred embodiments of the present invention will be described hereinafter with reference to the accompanying drawings.

Figure 1:
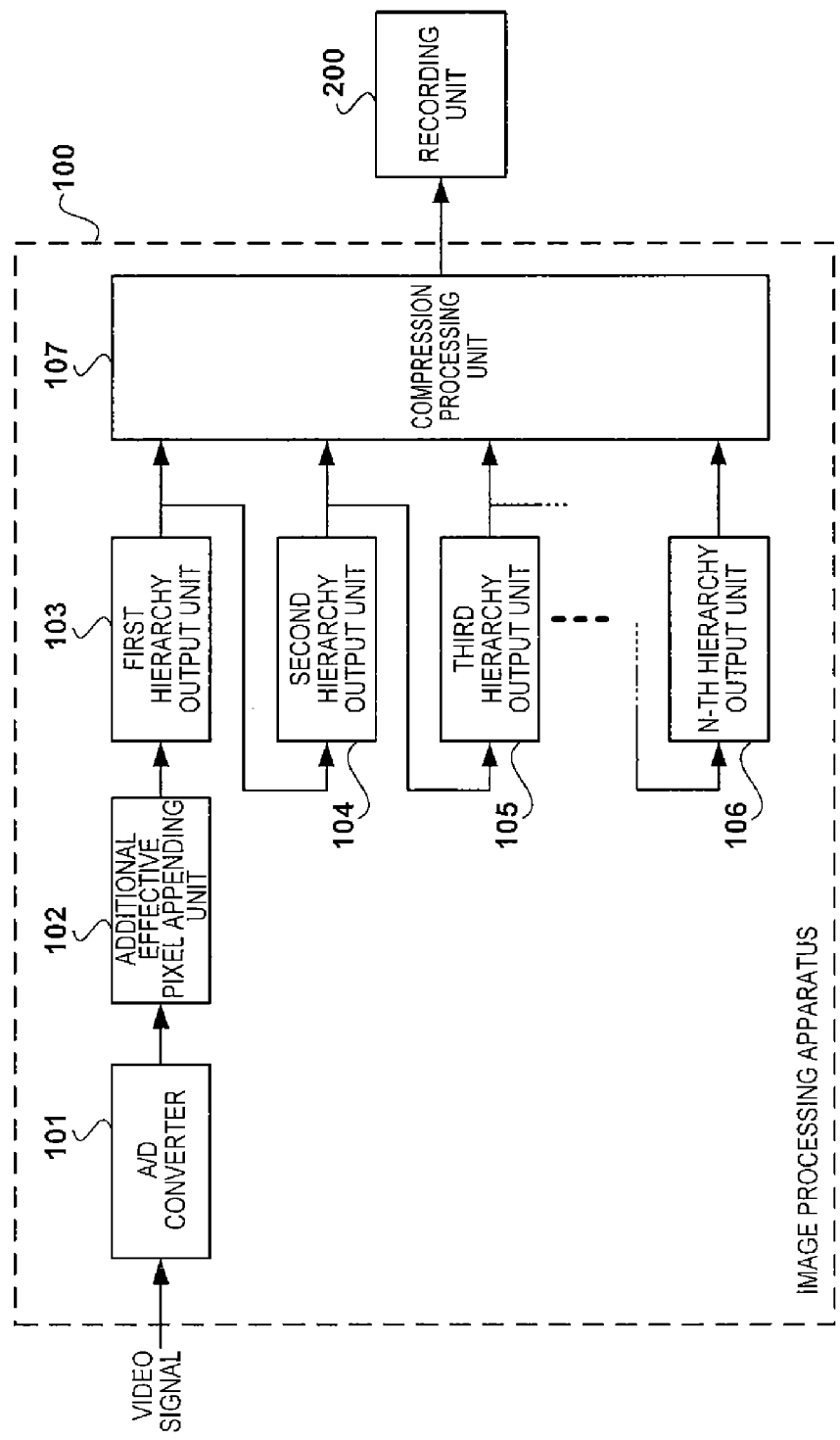
FIG. 1 is a block diagram showing an example of the arrangement of an image processing apparatus according to an embodiment.

FIG. 1 is a block diagram showing an example of the arrangement of an image processing apparatus according to this embodiment. An image processing apparatus 100 of this embodiment is built in, for example, a digital video camera, and records a plurality of images of a plurality of hierarchies (for example, an image pyramid) generated by reduction processing in a recording medium 200. A video signal (analog video signal) input to the image processing apparatus 100 is converted into a digital video signal by an A/D converter 101.

The A/D converter 101 outputs digital pixel data in synchronism with a pixel clock input from an imaging unit (not shown). A horizontal sync signal included in the video signal indicates start of pixel data for one line in the horizontal direction, and a vertical sync signal indicates the start of pixel data for one frame.

An additional effective pixel appending unit 102 receives outputs from the A/D converter 101 as an input image, and executes first appending processing for copying a pixel at an end portion (a terminal end in this embodiment) in a horizontal scanning direction of each horizontal line to extend the horizontal scan line in the horizontal scanning direction, thereby appending an additional effective pixel in the horizontal direction. The additional effective pixel appending unit 102 executes second appending processing by copying a horizontal line at an end portion (a terminal end in this embodiment) in the vertical direction of the input image to extend the input image in a vertical scanning direction, thereby appending additional effective pixels. A width of additional effective pixels to be appended is set based on the number of pixels to be referred to in filter processing required to output an image of each hierarchy (to be described later). These additional effective pixel appending processes are border processes required to generate an image pyramid, and details thereof will be described later.

A first hierarchy output unit 103 outputs an image for which the size of the input image is maintained, that is, an image before reduction processing, as an image of a first hierarchy. The first hierarchy output unit 103 may output data before the additional effective pixel appending processing of the additional effective pixel appending unit 102. A second hierarchy output unit 104 outputs a reduced image by applying filter processing to an image to which additional effective pixels are appended by the additional effective pixel appending unit 102 as an image of a second hierarchy. For example, the second hierarchy output unit 104 generates and outputs a reduced image by applying filter processing using a reduction filter using 3×3 pixels. A third hierarchy output unit 105 outputs a reduced image obtained by applying filter processing to the reduced image output from the second hierarchy output unit 104 as an image of a third hierarchy. Each of the subsequent hierarchy output units generates and outputs another reduced image by applying filter processing to a reduced image obtained by the hierarchy immediately above the current hierarchy. Then, an N-th hierarchy output unit 106 generates a reduced image using that output from an (N-1)-th hierarchy output unit, and outputs that image as an image of an N-th hierarchy.

A compression processing unit 107 applies compression processing to image data output from the first hierarchy output unit 103 to the N-th hierarchy output unit 106, and records the compressed image data in the recording medium 200. A reduction process of each hierarchy required to generate an image pyramid and border processing between an effective pixel and an ineffective pixel at a frame end by the additional effective pixel appending unit 102 will be described below.

Figure 2:
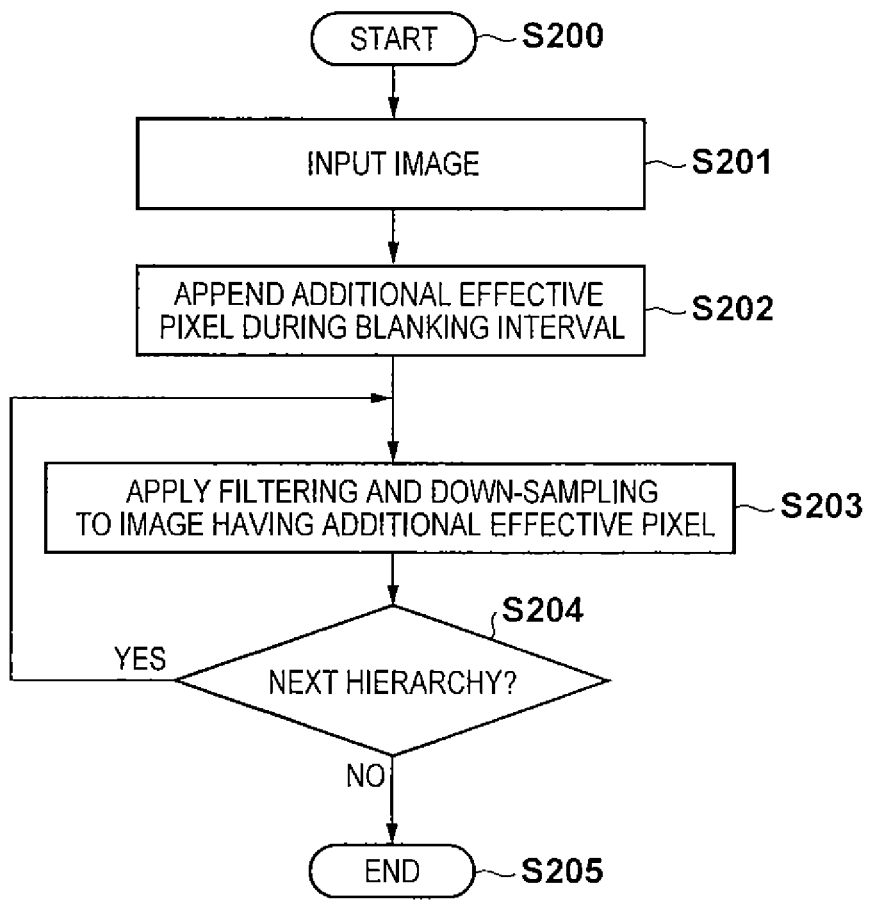
FIG. 2 is a flowchart for explaining a reduction process by the image processing apparatus according to the embodiment.

FIG. 2 is a flowchart of the reduction process by the image processing apparatus 100 of this embodiment. "S" in FIG. 2 indicates a step. When the reduction process is started in step S200, the additional effective pixel appending unit 102 receives an image in step S201, and appends additional effective pixels in accordance with the number of output hierarchies, reduction ratios, coefficients of reduction filters (a size of a pixel group to be referred to by each filter), and the like in step S202. Note that a method of defining an effective pixel, which is located at an end portion, of a plurality of effective pixels, as an auxiliary effective pixel, and using a signal value of that auxiliary effective pixel only for filtering processing in the same manner as an additional effective pixel appended by the additional effective pixel appending unit 102 is also available. When a sufficient number of such auxiliary effective pixels exist, the additional effective pixel appending processing may be skipped or the number of additional effective pixels to be appended may be reduced.

The image of the first hierarchy is the input image, and the images of the second and subsequent hierarchies are reduced images. Steps S203 and S204 (to be described below) show processes for generating images of the second and subsequent hierarchies. As the image of the second hierarchy, the second hierarchy output unit 104 generates a reduced image by applying filtering to the image appended with additional effective pixels, which is generated by the additional effective pixel appending unit 102. After this reduced image is generated, each of the third hierarchy output unit 105 and the subsequent n-th hierarchy output units generates an n-th (n is an integer equal to or larger than 2) reduced image by applying filtering to a reduced image output from an (n-1)-th hierarchy output unit. In this manner, multi-hierarchy reduced images are generated.

In step S203, the second hierarchy output unit 104 generates a reduced image as an image of the second hierarchy by applying filtering processing to the image to which additional effective pixels are appended by the additional effective pixel appending unit 102 in step S202. When the second hierarchy output unit 104 executes reduction processing in the horizontal direction, it applies down-sampling by executing thinning so that the centroid of an effective pixel at the right end in the horizontal direction included in image data before the reduction processing matches that of an effective pixel at the right end in the horizontal direction included in image data after the reduction processing. In the result, as shown in FIG. 3, for example, centroids of the pixel P8 in the first hierarchy, the pixel P15 of the second hierarchy (reduced image of an image in the first hierarchy) and the pixel P18 of the third hierarchy (reduced image of an image in the second hierarchy) will match. On the other hand, when the second hierarchy output unit 104 executes reduction processing in the vertical direction, it applies down-sampling by executing thinning so that the centroid of an effective pixel at the lower end in the vertical direction included in image data before the reduction processing matches that of an effective pixel at the lower end in the vertical direction included in image data after the reduction processing. Note that this is the example of thinning when signals of pixels are read out from the left to the right in turn from a line at the upper end. When each individual hierarchy output unit executes reduction processing in the horizontal direction, it may execute down-sampling so that the centroids of effective pixels at the terminal end in the horizontal scanning direction match before and after the reduction processing. Likewise, when each individual hierarchy output unit executes reduction processing in the vertical direction, it may execute down-sampling so that the centroids of effective pixels at the terminal end in the vertical scanning direction match before and after the reduction processing.

Then, if the next hierarchy is to be output (YES in step S204), the process returns to step S203; if no more hierarchy is to be output (NO in step S204), the reduction process ends in step S205.

If the process returns from step S204 to step S203, a target to which the reduction processing is applied is the reduced image obtained by the immediately preceding process of step S203. For example, the third hierarchy output unit 105 obtains another reduced image by applying filter processing to a reduced image output from the second hierarchy output unit 104 in step S203. Note that when the hierarchy output units are arranged for respective hierarchies, as shown in FIG. 1, filters used in the reduction processing can be changed for respective hierarchies. If a common filter is used for the respective hierarchies, the image of the second hierarchy as an output of the second hierarchy output unit 104 may be used as an input to the second hierarchy output unit 104 to generate an image of the third hierarchy.

FIG. 3 is a view showing an example of the configuration of the reduction process. Assume that image data of the first hierarchy is a first image, that of the second hierarchy is reduced image data obtained by reducing the image data of the first hierarchy to ½, and that of the third hierarchy is reduced image data obtained by reducing the image data of the second hierarchy to ½.

Assume that image data 301 of the first hierarchy during a video effective period includes pixels P1 to P8. In order to generate image data of the second hierarchy, digital filter processing is applied to respective pixels of the image data of the first hierarchy, thus thinning out pixels. Since the centroids of pixels at the right end are to be matched before and after the reduction processing, a pixel on the right side position (for example, pixels P2, P4, P6, and P8) when two neighboring pixels form one pair is left after thinning.

A pixel P12 is generated by calculating:

$$P12=(P1+P2\times 2+P3)/4$$

Likewise, pixels P13 and P14 are generated by respectively calculating:

$$P13=(P3+P4\times 2+P5)/4$$

$$P14=(P5+P6\times 2+P7)/4$$

In order to generate a pixel P15, a pixel P9 is required. However, the image data 301 of the first hierarchy during the video effective period does not include any effective pixel corresponding to the pixel P9. For this reason, processing for appending additional effective pixels using an effective pixel of the image data of the first hierarchy has to be executed. Let 302 be a period of processing for appending additional effective pixels. During the period 302, the pixel P8 which exists during the video effective period is held to generate P9=P8, P10=P8, and P11=P8, thereby appending additional effective pixels. Note that the reason why the pixel P11 is generated as an additional effective pixel is to generate image data of the third hierarchy. Thus, a value of the pixel P15 of the second hierarchy is calculated by:

$$P15=(P7+P8\times 2+P9)/4$$

Also, in order to generate image data of the third hierarchy, a value of a pixel P16 is calculated by:

$$P16=(P9+P10\times 2+P11)/4$$

Furthermore, in order to generate the image data of the third hierarchy, digital filter processing is applied to respective pixels of the image of the second hierarchy to thin out pixels. A pixel P17 is generated by calculating:

$$P17=(P12+P13\times 2+P14)/4$$

Also, a pixel P18 is generated using the pixels P14 to P16 of the second hierarchy by calculating:

$$P18=(P14+P15\times 2+P16)/4$$

As described above, by executing the thinning phase using pixels on the right side position such as the pixels P2, P4, P6, and P8, additional effective pixels required for the digital filter processing can be gathered on the right side of effective pixels. That is, no additional effective pixel need be appended to a start end in the scanning direction.

In order to generate a plurality of reduced images, processing for appending additional effective pixels using effective pixels during the video effective period using only image data of the first hierarchy is executed during a horizontal blanking interval. In this embodiment, since pixels required for the filter processing are only those at the right side as the terminal end in the horizontal scanning direction, additional effective pixels can be appended by holding a small number of delay elements, that is, only the pixel P8 during the horizontal blanking interval.

The reduction in the horizontal direction has been explained using FIG. 3. The thinning phase in the horizontal direction is on the right side position, while the position to be left after thinning in the vertical direction is that on the lower side. For this reason, as for reduction in the vertical direction, since pixels required for the filter processing are only those on the lower side, additional effective pixels can be appended using a small number of line memories during a vertical blanking interval.

Figure 4:
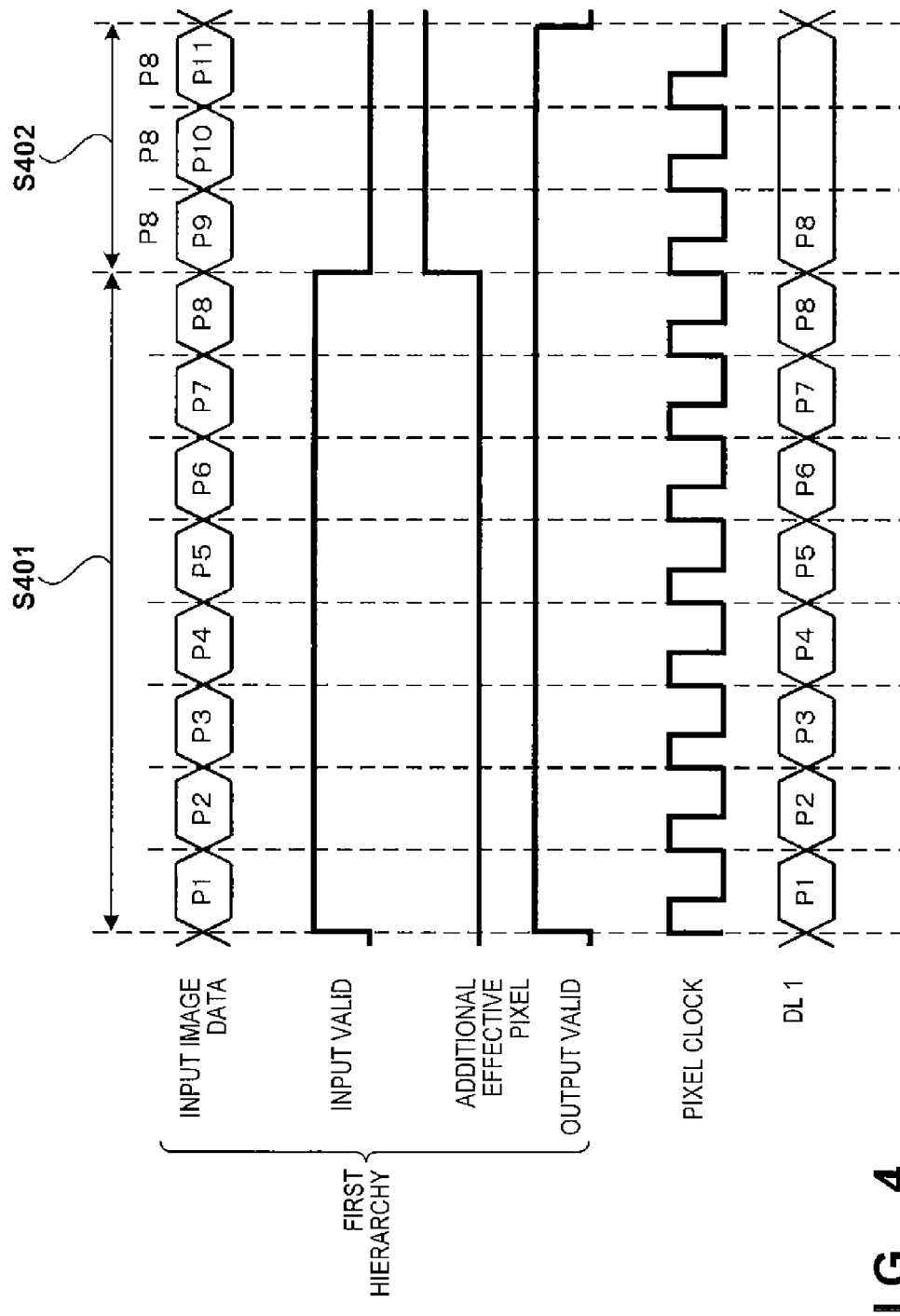
FIG. 4 is a timing chart associated with appending of additional effective pixels according to the embodiment.

FIG. 4 is a timing chart of the additional effective pixel appending unit 102 according to this embodiment. A period 401 represents data during the video effective period, and a period 402 represents data during the blanking interval. Image data of the first hierarchy is input from pixels P1 to P8 in synchronism with pixel clocks during the period 401 (while a VALID signal of the input image indicates valid). When a signal required to append additional effective pixels goes high during the period 402, a delay element DL1 holds the pixel P8. Using the data P8 held by the delay element DL1, additional effective pixels P9=P8, P10=P8, and P11=P8 are appended.

Figure 5:
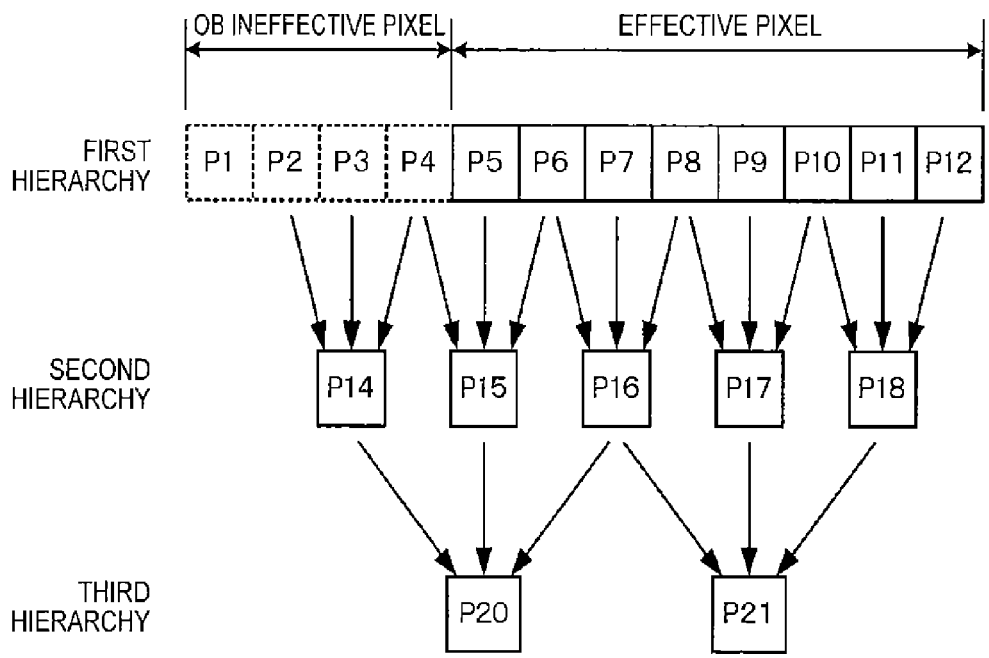
FIG. 5 is a view for explaining a general reduction process including an OB region.

General multi-hierarchy reduced image acquisition processing and additional effective pixel appending processing will be described so as to explain a merit of this embodiment. FIG. 5 describes a general example of processing at a border between effective pixels and ineffective pixels of respective hierarchies. When pixels P1 to P4 are ineffective pixels in an OB region, and pixels P5 to P12 are effective pixels, an appending position of an additional effective pixel in image data of the first hierarchy is that of the pixel P5. In order to generate a pixel P15 of image data of the second hierarchy, the pixel P4 is required, but P4=P5 since the pixel P4 is ineffective.

An appending position of an additional effective pixel in the image data of the second hierarchy is that of the pixel P15. In order to generate a pixel P20 of image data of the third hierarchy, a pixel P14 is required, but P14=P15 since the pixel P14 is ineffective. As described above, upon generation of multi-hierarchy reduced images, every time a reduced image of each hierarchy is generated, a pixel to which an additional effective pixel is to be appended has to be set.

By contrast, in this embodiment, additional effective pixels of a width required to generate reduced images of all the subsequent hierarchies are appended to the right side and lower side of effective pixels of only image data of the first hierarchy. Then, upon reduction, thinning is executed so that positions of centroids of effective pixels at the right end and those at the lower end are matched before and after the reduction processing. With this processing, processing for appending additional effective pixels to reduced images of respective hierarchies as the second and lower hierarchies need not be executed. That is, according to this embodiment, a plurality of hierarchies of satisfactory reduced images can be generated without judging a border between effective pixels and ineffective pixels of image data of respective hierarchies as the second and lower hierarchies and appending additional effective pixels.

When additional effective pixels of a sufficient width are to be appended to an input image so as to obviate the need for border processing (additional effective pixel appending processing) for each hierarchy, problems to be posed upon appending additional effective pixels to the left side or upper side of effective pixels will be described below with reference to FIG. 6.

When thinning is executed so that centroids of effective pixels at the left end are to be matched before and after thinning of a reduced image of each hierarchy, a pixel P9 of the first hierarchy is required to output a pixel P12 of the second hierarchy. Also, a pixel P16 of the second hierarchy is required to output a pixel P17 of the third hierarchy. However, in order to output the pixel P16 of the second hierarchy, pixels P11, P10, and P9 of the first hierarchy are required. For this purpose, processing for appending additional effective pixels P9=P1, P10=P1, and P12=P1 is required. While the pixels P9, P10, and P11 are output as additional effective pixels, since the pixel P1 is in a video effective period 601, a memory used to hold data P1, P2, and P3 during the video effective period is required.

Figure 6:
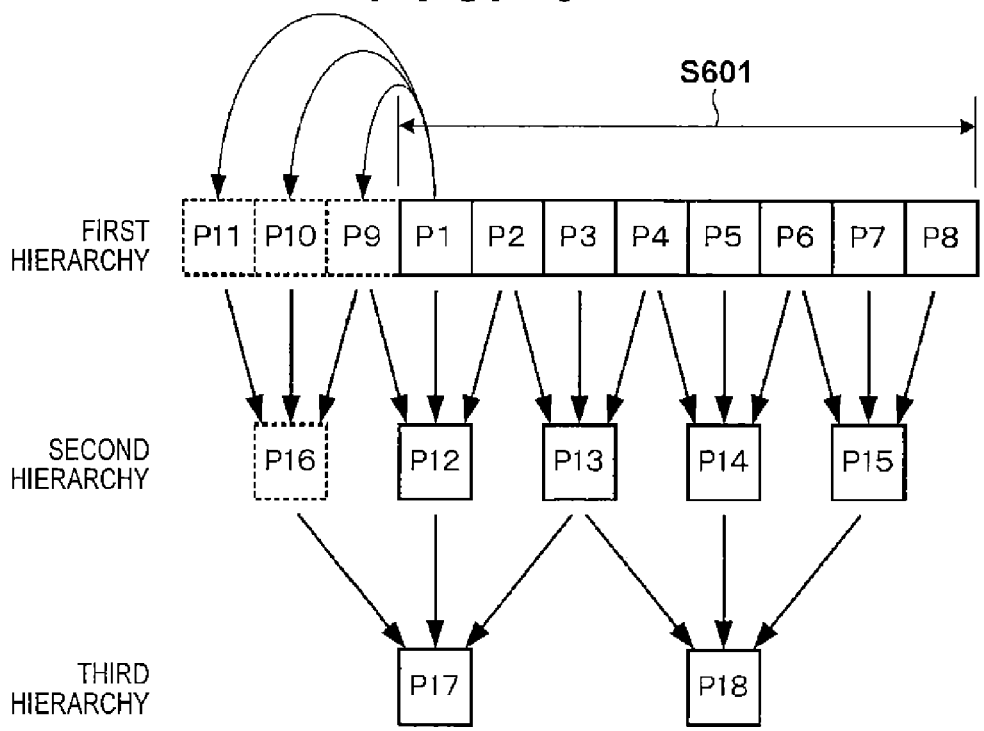
FIG. 6 is a view for explaining a reduction process when an additional effective pixel is added to the left side in a scanning direction.
Figure 7:
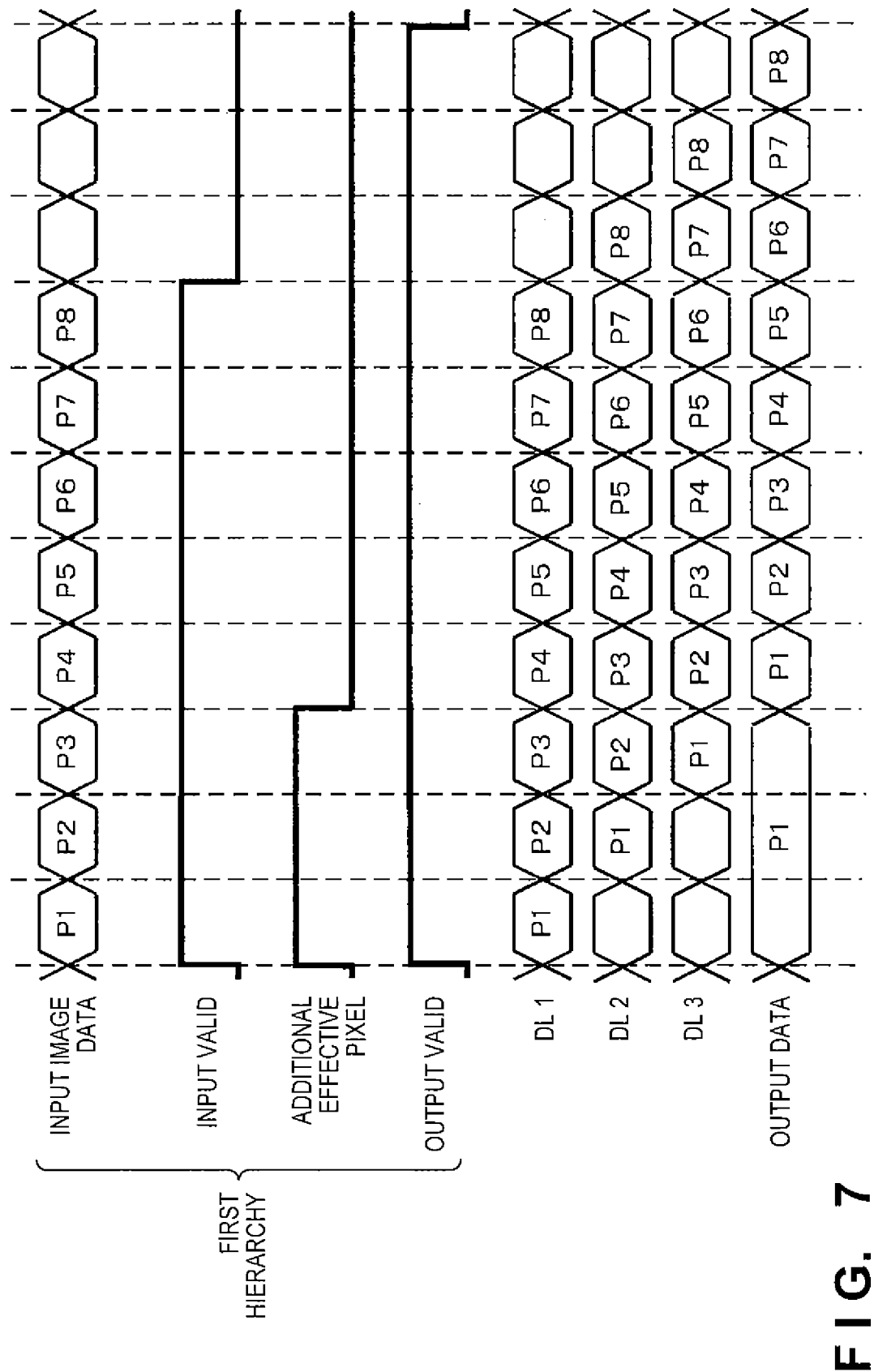
FIG. 7 is a timing chart associated with appending of additional effective pixels in the reduction process shown in FIG. 6.

FIG. 7 is a timing chart for when the additional effective pixel appending processing shown in FIG. 6 is executed, and positions to be left after thinning are those on the left side in horizontal reduction processing and those on the upper side in vertical reduction processing. As can be seen from FIG. 7, in order to output a pixel P1 of the first hierarchy during a high period of a signal required to prepend additional effective pixels in the first hierarchy, delay elements DL1, DL2, and DL3 used to hold values of pixels P1, P2, and P3 are required.

Therefore, when the number of hierarchies required to generate reduced images is increased, and when positions to be left after thinning in the horizontal reduction processing are those on the left side, many delay elements of image data are required. Likewise, when a phase to be left after thinning in the vertical reduction processing is that on the upper side, many image data line memories are required.

By contrast, additional effective pixels are appended to the right side and lower side of an input image, and positions to be left after thinning in respective reduction processes are those on the right side and those on the lower side. For this reason, a memory used to hold a value of one pixel at the terminal end in the horizontal scanning direction suffices to execute the additional effective pixel appending processing in the horizontal scanning direction. Also, a memory used to hold values of pixels of one horizontal line at the terminal end in the vertical scanning direction suffices to execute the additional effective pixel appending processing in the vertical scanning direction.

Furthermore, according to this embodiment, an additional effective pixel appending period is set to be a period which is not the video effective period; for example, the horizontal blanking interval or vertical blanking interval. Thus, even in the case of on-the-fly processing of a movie or the like, required additional effective pixels can be appended using a small number of delay elements or a small number of line memories in association with image data of the first hierarchy. This is because image data during the video effective period are not input during the horizontal blanking interval or vertical blanking interval, and many memories used to hold the image data during the video effective period are not required.

As described above, according to the image processing apparatus of this embodiment, additional effective pixels of a width required to generate reduced images of all the hierarchies are appended to the terminal ends in the scanning directions of image data of the first hierarchy. Furthermore, according to the image processing apparatus of this embodiment, in order to generate a reduced image for each hierarchy, thinning phases are set to leave pixels at the terminal ends in the scanning directions. With this arrangement, the arrangement associated with required delay memories and the like can be simplified, and satisfactory reduced images can be generated without appending any additional effective pixels in the respective second and lower hierarchies.

Furthermore, according to the embodiment, since additional effective pixels are appended during the blanking interval, which is not the video effective period for an input image, many delay elements and line memories required to append additional effective pixels need not be included. Also, according to the embodiment, reduced images can be generated without executing the additional effective pixel appending processing in respective reduction processes, and processing efficiency upon execution of the on-the-fly processing, which processes data without going through a DRAM in movie capturing or the like, can be improved.

Note that some units of the aforementioned image processing apparatus 100 can also be implemented by software, needless to say. For example, the additional effective pixel appending unit 102, the first to N-th hierarchy output units 103 to 106, and compression processing unit 107 may be implemented by a CPU which executes predetermined software.

The above embodiment has exemplified the case in which reduced image data is generated by reducing image data of a hierarchy immediately above the current hierarchy to ½. However, this magnification may be an arbitrary magnification, needless to say. An arrangement which executes down-sampling to leave pixels at the terminal ends in the scanning directions even at a magnification other than ½ need only be adopted.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2012-020305 filed Feb. 1, 2012 and No. 2013-007847 filed Jan. 18, 2013, which are hereby incorporated by reference herein in their entirety.

What is claimed is:

1. An image processing apparatus comprising:
 a CPU configured to carry out functions of a pixel appending unit, a first generating unit, and a second generating unit:
  said pixel appending unit configured to generate first image data by executing appending processing for appending pixels required to extend effective image data, which is outputted from effective pixels included in an image sensor, in a scanning direction using pixels at an end portion of the effective image data in the scanning direction;

said first generating unit configured to generate second image data obtained by reducing the first image data by applying filtering to the first image data; and said second generating unit configured to generate third image data obtained by reducing the second image data by applying filtering to the second image data, wherein the second image data includes a second effective pixel whose centroid matches that of a first effective pixel at a terminal end of the effective image data in the scanning direction, and the third image data includes a third effective pixel whose centroid matches that of the second effective pixel.

2. The apparatus according to claim 1, wherein the effective image data is generated from a video signal, and said pixel appending unit extends each horizontal line in a horizontal scanning direction using a pixel at an end portion in the horizontal scanning direction of that horizontal line of the effective image data during a horizontal blanking interval of the video signal.

3. The apparatus according to claim 1, wherein the effective image data is generated from a video signal, and said pixel appending unit extends the effective image data in a vertical scanning direction using a horizontal line at an end portion in the vertical scanning direction of the effective image data during a vertical blanking interval of the video signal.

4. An image processing apparatus comprising:

a CPU configured to carry out functions of a pixel appending unit, a first generating unit, and a second generating unit:

said pixel appending unit configured to generate first image data by executing appending processing for appending pixels required to extend effective image data, which is outputted from effective pixels included in an image sensor, in a scanning direction using pixels at an end portion of the effective image data in the scanning direction;

said first generating unit configured to generate second image data obtained by reducing the first image data by applying filtering to the first image data; and said second generating unit configured to generate third image data obtained by reducing the second image data by applying filtering to the second image data, wherein said pixel appending unit extends the effective image data in the horizontal scanning direction using a pixel at a terminal end of each horizontal line of the effective image data in association with a direction of processing of the filtering of that horizontal line of the first image data.

5. An image processing apparatus comprising:

a CPU configured to carry out functions of a pixel appending unit, a first generating unit, and a second generating unit:

said pixel appending unit configured to generate first image data by executing appending processing for appending pixels required to extend effective image data, which is outputted from effective pixels included in an image sensor, in a scanning direction using pixels at an end portion of the effective image data in the scanning direction;

said first generating unit configured to generate second image data obtained by reducing the first image data by applying filtering to the first image data; and said second generating unit configured to generate third image data obtained by reducing the second image data by applying filtering to the second image data, wherein said pixel appending unit extends the effective image data in the vertical scanning direction using a horizontal line at a terminal end of effective image data in association with a direction of processing of the filtering of the first image data.

6. The apparatus according to claim 1, wherein said pixel appending unit appends pixels of a width required for said first generating unit and said second generating unit to generate reduced images to the effective image data.

7. An image processing apparatus comprising:

a CPU configured to carry out functions of a pixel appending unit, a first generating unit, and a second generating unit:

said pixel appending unit configured to generate first image data by executing appending processing for appending pixels required to extend effective image data, which is outputted from effective pixels included in an image sensor, in a scanning direction using pixels at an end portion of the effective image data in the scanning direction;

said first generating unit configured to generate second image data obtained by reducing the first image data by applying filtering to the first image data; and said second generating unit configured to generate third image data obtained by reducing the second image data by applying filtering to the second image data, wherein said pixel appending unit appends pixels of a width required for said first generating unit and said second generating unit to generate reduced images to the effective image data, and sets the width of the pixels based on a reduction ratio of the reduced images generated by said first generating unit and said second generating unit, and a size of a region of pixels to be referred to by the filtering.

8. An image processing method by an image processing apparatus, said method comprising:

a pixel appending step of generating, by a CPU, first image data by executing appending processing for appending pixels required to extend effective image data, which is outputted from effective pixels included in an image sensor, in a scanning direction using pixels at an end portion of the effective image data in the scanning direction;

a first generating step of generating, by the CPU, second image data by reducing the first image data by applying filtering to the first image data; and a second generating step of generating, by the CPU, third image data obtained by reducing the second image data by applying filtering to the second image data, wherein the second image data includes a second effective pixel whose centroid matches that of a first effective pixel at a terminal end in the scanning direction, and the third image data includes a third effective pixel whose centroid matches that of the second effective pixel.

9. A non-transitory computer readable storage medium storing a program for controlling a computer to execute respective steps of an image processing method of claim 8.

10. An image processing method by an image processing apparatus, said method comprising:

an pixel appending step of generating, by a CPU, first image data by executing appending processing for appending pixels required to extend effective image data, which is outputted from effective pixels included in an image sensor, in a scanning direction using pixels at an end portion of the effective image data in the scanning direction;

a first generating step of generating, by the CPU, second image data obtained by reducing the first image data by applying filtering to the first image data; and a second generating step of generating, by the CPU, third image data obtained by reducing the second image data by applying filtering to the second image data, wherein the pixel appending step extends the effective image data in the horizontal scanning direction using a pixel at a terminal end of each horizontal line of the effective image data in association with a direction of processing of the filtering of that horizontal line of the first image data.

11. An image processing method by an image processing apparatus, said method comprising:

an pixel appending step of generating, by a CPU, first image data by executing appending processing for appending pixels required to extend effective image data, which is outputted from effective pixels include in an image sensor, in a scanning direction using pixels at an end portion of the effective image data in the scanning direction;

a first generating step of generating, by the CPU, second image data obtained by reducing the first image data by applying filtering to the first image data; and a second generating step of generating, by the CPU, third image data obtained by reducing the second image data by applying filtering to the second image data, wherein the pixel appending step extends the effective image data in the vertical scanning direction using a horizontal line at a terminal end of effective image data in association with a direction of processing of the filtering of the first image data.

12. An image processing method by an image processing apparatus, said method comprising:

an pixel appending step of generating, by a CPU, first image data by executing appending processing for appending pixels required to extend effective image data, which is outputted from effective pixels included in an image sensor, in a scanning direction using pixels at an end portion of the effective image data in the scanning direction;

a first generating step of generating, by the CPU, second image data obtained by reducing the first image data by applying filtering to the first image data; and a second generating step of generating, by the CPU, third image data obtained by reducing the second image data by applying filtering to the second image data, wherein the pixel appending step appends pixels of a width required for said first generating unit and said second generating unit to generate reduced images to the effective image data, and sets the width of the pixels based on a reduction ratio of the reduced images generated in the first generating step and the second generating step, and a size of a region of pixels to be referred to by the filtering.

13. A non-transitory computer readable storage medium storing a program for controlling a computer to execute respective steps of an image processing method of claim 10.

14. A non-transitory computer readable storage medium storing a program for controlling a computer to execute respective steps of an image processing method of claim 11.

15. A non-transitory computer readable storage medium storing a program for controlling a computer to execute respective steps of an image processing method of claim 12.

16. The apparatus according to claim 1, wherein said pixel appending unit extends the effective image data in the horizontal scanning direction using a pixel at a terminal end of each horizontal line of the effective image data in association with a direction of processing of the filtering of that horizontal line of the first image data.

17. The apparatus according to claim 1, wherein said pixel appending unit extends the effective image data in the vertical scanning direction using a horizontal line at a terminal end of the effective image data in association with a direction of processing of the filtering of that vertical line of the first image data.

18. The apparatus according to claim 1, wherein said pixel appending unit appends pixels of a width required for said first generating unit and said second generating unit to generate reduced images to the effective image data, and sets the width of the pixels based on a reduction ratio of the reduced images generated by said first generating unit and said second generating unit, and a size of a region of pixels to be referred to by the filtering.

19. The apparatus according to claim 1, the image sensor includes the effective pixels and ineffective pixels which are arranged outside the effective pixels.

20. The apparatus according to claim 4, the image sensor includes the effective pixels and ineffective pixels which are arranged outside the effective pixels.

21. The apparatus according to claim 5, the image sensor includes the effective pixels and ineffective pixels which are arranged outside the effective pixels.

22. The apparatus according to claim 7, the image sensor includes the effective pixels and ineffective pixels which are arranged outside the effective pixels.

* * * * *